United States Patent [19]
Hartland

[11] Patent Number: 5,279,397
[45] Date of Patent: Jan. 18, 1994

[54] CONDUCTOR RAILS

[75] Inventor: David J. Hartland, Taunton, England

[73] Assignee: Brecknell, Willis & Co. Ltd., Chard, England

[21] Appl. No.: 951,584

[22] Filed: Sep. 25, 1992

[30] Foreign Application Priority Data

Sep. 28, 1991 [GB] United Kingdom ............ 9120676

[51] Int. Cl.⁵ ............................................. B60M 1/30
[52] U.S. Cl. ........................ 191/22 DM; 191/29 DM
[58] Field of Search ............. 191/22 R, 22 DM, 29 R, 191/29 DM, 33 R, 33 PM; 428/653

[56] References Cited

U.S. PATENT DOCUMENTS

| | | | |
|---|---|---|---|
| 3,341,669 | 9/1967 | Martin et al. | 191/29 DM |
| 3,544,737 | 12/1970 | Nowak | 191/22 DM X |
| 3,582,575 | 6/1971 | Scofield | 191/29 DM |
| 3,733,696 | 5/1973 | Scofield et al. | 191/22 DM X |
| 3,836,394 | 9/1974 | Kugler et al. | 191/22 DM X |
| 3,917,039 | 11/1975 | Maitland | 238/43 X |
| 4,014,417 | 3/1977 | Kugler et al. | 191/29 DM |
| 5,047,595 | 9/1991 | Hartland | 191/22 DM |
| 5,061,829 | 10/1991 | Mier | 191/22 DM |

FOREIGN PATENT DOCUMENTS

| | | | |
|---|---|---|---|
| 2455708 | 5/1976 | Fed. Rep. of Germany | 191/22 DM |
| 2286680 | 7/1977 | France . | |
| 0279939 | 11/1988 | Japan | 191/22 DM |
| 0215637 | 8/1989 | Japan | 191/22 DM |
| 118463 | 1/1948 | Netherlands . | |
| 1415904 | 12/1975 | United Kingdom . | |
| 2028745 | 3/1980 | United Kingdom | 191/22 DM |

OTHER PUBLICATIONS

Metals Handbook, 9th ed., vol. 3, "Properties and Selection: Stainless Steels, Tool materials and special-Purpose Metals", 1980, pp. 3-13.

Primary Examiner—Michael S. Huppert
Assistant Examiner—Scott L. Lowe
Attorney, Agent, or Firm—Ware, Fressola, Van Der Sluys & Adolphson

[57] ABSTRACT

A conductor rail has a main body (10) of aluminum and a facing layer (11) formed of a steel having a chromium content of between 10 and 13.5% by weight. The preferred steel composition is that of British Standard No. 416 S21.

10 Claims, 1 Drawing Sheet

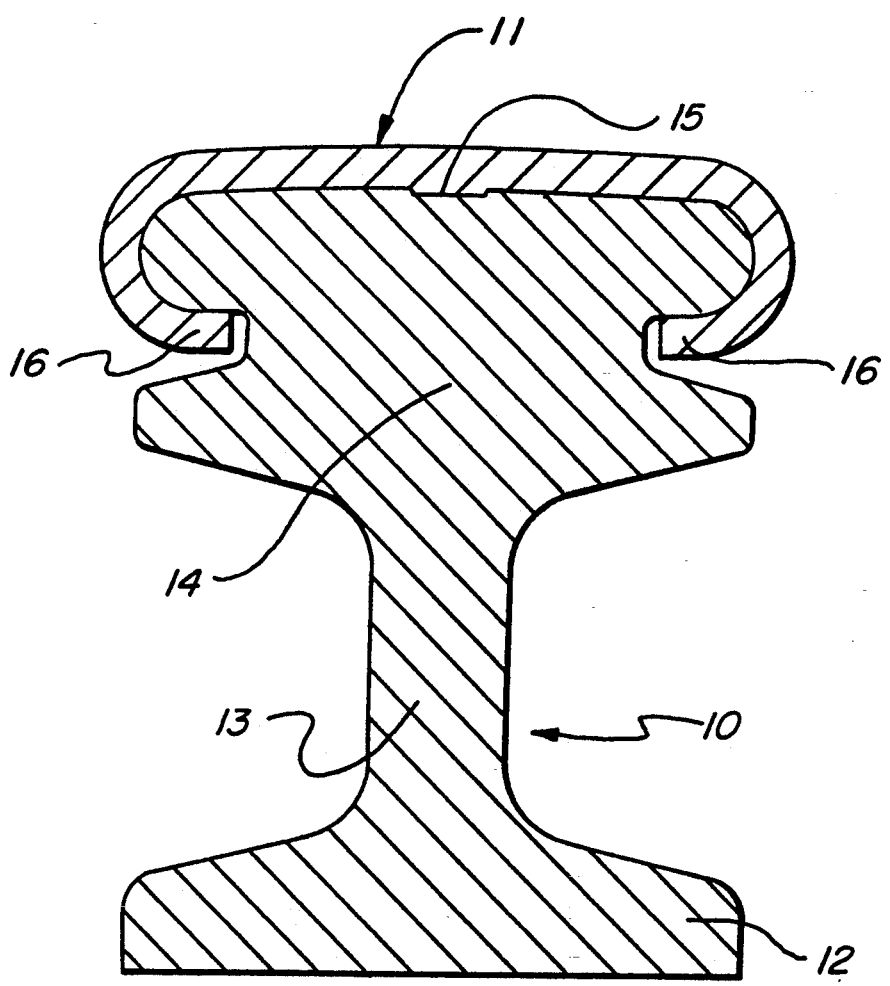

CONDUCTOR RAILS

FIELD OF THE INVENTION

This invention relates to conductor rails, such as are used in electric railway systems and in other transportation systems such as overhead conveyors, and is concerned with rails which include a main body of aluminium and a wear-resisting facing layer of steel.

BACKGROUND TO THE INVENTION

One method of producing conductor rails is described in French Patent Specification No. 2 286 680 and comprises bending the steel facing layer into contact with the main body and then effecting a crimping operation to key the facing strip into interlocking engagement with the main body.

Another method of producing conductor rails is described in Applicant's U.S. Pat. No. 5,047,595 and includes forming the facing layer as two or more portions which are welded together in contact with the main body in such manner as to obtain a mechanical interlocking engagement of the facing layer with the main body.

The steel from which the facing layer has been formed has been stainless steel and, traditionally, the chromium content of the stainless steel has been of the order of 18% by weight since this percentage chromium has been considered necessary to obtain the optimum characteristics for the facing layer. The use of a stainless steel of this composition is mentioned in, for example, British Patent Specification No. 1 415 904.

It is an object of the present invention to provide a conductor rail comprising a main body of aluminium and a steel facing layer in which the composition of the steel is such as to provide improved characteristics as compared to the use of a steel having an 18% by weight chromium content.

In addition, it is an object of the present invention to provide a conductor rail as discussed above which has cost-saving advantages as compared with a conductor rail which includes a facing layer formed from a stainless steel having an 18% by weight chromium content.

SUMMARY OF THE INVENTION

According to a first aspect of the present invention there is provided a conductor rail comprising a main body of aluminium and a facing layer formed of a steel having a chromium content of between 10 and 13.5% by weight.

The preferred composition of the steel of which the facing layer is formed is:

| Chromium | 11.5 to 13.5% by weight, |
|---|---|
| Nickel | less than 1.5% by weight, |
| Molybdenum | less than 0.6% by weight. |

According to a second aspect of the present invention there is provided a method of manufacturing a conductor rail comprising a main body of aluminium and a steel facing layer, characterised in that the steel from which the facing layer is formed has a chromium content of between 10 and 13.5% by weight.

The method of manufacturing the facing layer and ensuring effective bonding thereof to the main body of aluminium is preferably as described in U.S. Pat. No. 5,047,595 mentioned above and to which reference should be made.

A specific type of steel which may be used for the production of the facing layer is that in accordance with British Standard No. 416 S21 which has a composition as follows:

| Chromium | 11.5 to 13.5% by weight, |
|---|---|
| Carbon | 0.09 to 0.15% by weight, |
| Nickel | not more than 1.0% by weight, |
| Molybdenum | not more than 0.6% by weight, |
| Manganese | not more than 1.5% by weight, |
| Silicon | not more than 1.0% by weight, |
| Sulphur | 0.15 to 0.3% by weight, |
| Phosphorus | not more than 0.04% by weight. |

An important advantage of the use of a steel of the above composition is that not only is the interface resistance between the facing layer and the body of the rail significantly less than the resistance of a corresponding rail section produced using a steel facing layer having an 18% by weight chromium content, but the rate of degradation of the rail conductivity is significantly less. For example, with a facing layer formed from a steel having a 12% chromium content, the interface resistance increased during accelerated ageing tests by between 15 and 20% whereas, with a facing layer formed from a steel having an 18% chromium content, the interface resistance increased during the same period by between 75 and 100%.

The rate of atmospheric corrosion in a marine/industrial environment of a facing layer formed from a stainless steel having a chromium content of 18% by weight and a nickel content of 8% by weight is of the order of 0.005 micrometer/year, whereas the corresponding rate of corrosion for a steel having a 12% by weight chromium content is of the order of 0.2 micrometers/year. It has thus been assumed traditionally that the material having the lower rate of atmospheric corrosion is the preferred material.

This traditional view has been accepted generally. The present invention is thus based on a departure from accepted practice and is based on the use of a material which, on the application of "conventional wisdom", would have been rejected as unsatisfactory but which, as explained herein, has more than adequate corrosion-resistance properties and improved electrical properties. It also has important cost-saving advantages in that the cost of a steel having, for example, a 12% chromium content is of the order of 25% cheaper than an 18:8 chromium/nickel stainless steel.

The facing layer of the present invention is preferably formed of steel of the order of 5 millimeters in thickness so that, for a guaranteed working life of 50 years, a total corrosion of $50 \times 0.2 = 10$ micrometers is not going to seriously impair the effectiveness of the facing layer.

BRIEF DESCRIPTION OF THE DRAWING

The single FIGURE of the accompanying drawing is a transverse sectional view of a conductor rail.

DESCRIPTION OF THE PREFERRED EMBODIMENT

The conductor rail shown in the drawing is for an electric railway system and comprises a main body 10 formed of aluminium (which is hereinafter referred to either as the aluminium body 10 or as the main body 10) to which is attached a facing layer 11 formed by welding together two longitudinal steel strips in the manner described in detail in Applicant's U.S. Pat. No. 5,047,595 to which reference should again be made.

The aluminium body 10 comprises a base portion 12, a parallel-sided vertical stem portion 13 and a head portion 14 having a width corresponding to that of the base portion 12. The head portion 14 has a generally planar upwardly presented surface which is formed with a central longitudinally extending rebate 15. For a rail having a total height of 105 millimeters, of which the base portion 12 has a width of 80 millimeters and the facing layer has a thickness of 5 millimeters, the rebate 15 may have a width of 10 millimeters and a depth of 0.5 millimeters. It is to be appreciated that these dimensions are purely indicative and that the rail may have a number of different cross-sectional configurations and dimensions.

As described in U.S. Pat. No. 5,047,595, the two steel strips from which the facing layer 11 is formed are each of generally J-form in cross-section, comprising an upper, longer limb, a lower, shorter limb 16 and an arcuate connecting portion. When the two strips are placed in position on the aluminium body 10, in readiness for the strips being welded together, the arcuate connecting portions fit closely over radiused surfaces of the head portion 14, and the lower limbs 16 are received within side channels formed in the head portion 14.

The rail is of indefinite, but substantial, length and the aluminium body 10 can be formed either as a casting or as an extrusion. For a rail having the dimensions set out above such that the aluminum body 10 has a cross-sectional area of approximately 5,000 square millimeters, the longitudinal resistance of the rail is of the order of 7 milliohms/kilometer.

The two steel strips which are welded together, in contact with the main body 10 to form the facing layer 11 are 5 millimeters in thickness and are formed of steel to British Standard No. 416 S21. This has a composition as follows:

| | |
|---|---|
| Chromium | 11.5 to 13.5% by weight, |
| Carbon | 0.09 to 0.15% by weight, |
| Nickel | not more than 1.0% by weight, |
| Molybdenum | not more than 0.6% by weight, |
| Manganese | not more than 1.5% by weight, |
| Silicon | not more than 1.0% by weight, |
| Sulphur | 0.15 to 0.3% by weight, |
| Phosphorus | not more than 0.04% by weight. |

Measurements were taken of the resistance of a number of rails between a conductor attached to the centre portion of the facing layer 11 and a conductor attached to part of the main body 10, at various points along the length of each rail. This resistance is hereinafter referred to as "the interface resistance" in that this resistance includes the resistance of the interface between the facing layer 11 and the main body 10.

Measurements of the interface resistance have also been taken over an extended period under accelerated ageing conditions corresponding to the expected life of the rail. These showed an increase in resistance of 15% over the experimental period.

In comparative tests carried out using a stainless steel to British Standard No. 316 S16 and having a chromium content of 18%, the initial interface resistance values were of the order of 25% greater than for the 416 type steel. In the corresponding ageing tests, the interface resistance increased by about 75%. This indicates that the present invention provides an interface between the facing layer 11 and the main body 10 which not only has a lower initial resistance but in which the improvement in conductivity increases with time.

The composition of a stainless steel in accordance with British Standard No. 316 S16 is as follows:

| | |
|---|---|
| Chromium | 16.5 to 18.5% by weight, |
| Carbon | not more than 0.07% by weight, |
| Nickel | 10 to 13% by weight, |
| Molybdenum | 2.25 to 3.0% by weight, |
| Manganese | 0.5 to 2.0% by weight, |
| Silicon | not more than 0.8% by weight, |
| Sulphur | not more than 0.03% by weight, |
| Phosphorus | not more than 0.04% by weight. |

Although the preferred steel composition is that of British Standard No. 416 S21, other 416 type steels can be used and the chromium content of the steel can vary within the range of from 10.0 to 13.5%, the preferred value being approximately 12%. The nickel content of the steel is preferably less than 1.5%, so as to reduce the overall cost of the steel. The molybdenum content of the steel is preferably less than 0.6%, for the same reason.

I claim:

1. A conductor rail comprising a main body of aluminium and a facing layer for contacting a collector shoe of an electric vehicle, said facing layer being formed of a steel having a chromium content of between 10 and 15% by weight.

2. A conductor rail according to claim 1, in which the chromium content of the steel is between 11.5 and 13.5% by weight.

3. A conductor rail according to claim 2, in which the chromium content of the steel is approximately 12% by weight.

4. A conductor rail according to claim 1, in which the steel has a nickel content of (the steel is) less than 1.5% by weight.

5. A conductor rail according to claim 4, in which the nickel content of the steel is less than 1.0% by weight.

6. A conductor rail according to claim 1, in which the steel has a molybdenum content of (the steel is) less than 0.6% by weight.

7. A conductor rail according to claim 1, in which the steel is in accordance with British Standard No. 416 S21.

8. A method of manufacturing a conductor rail comprising a main body of aluminium and a steel facing layer for contacting a collector shoe of an electric vehicle, said method comprising selecting a steel in strip form having (characterised in that the steel from which the facing layer is formed has) a chromium content of between 10 and 13.5% by weight and affixing said steel in strip form to the main body of aluminium so as to obtain a composite conductor rail having improved "interface resistance" characteristics.

9. A method according to claim 8, in which the facing layer is formed by welding together two J-section strips in contact with the main body.

10. A composite conductor rail having improved "interface resistance" characteristics, said conductor rail comprising a main body of aluminium and a facing layer for contacting a collector shoe of an electric rail vehicle, said facing layer being formed of steel strip having a composition in percentages by weight as follows:

| | |
|---|---|
| Chromium | 11.5 to 13.5, |
| Carbon | 0.09 to 0.15, |
| Nickel | not more than 1.0, |
| Molybdenum | not more than 0.6, |

-continued

| | |
|---|---|
| Manganese | not more than 1.5, |
| Silicon | not more than 1.0, |
| Sulphur | 0.15 to 0.3, |
| Phosphorus | not more than 0.04, and |
| Iron | the balance. |

* * * * *